United States Patent
Takahashi

(10) Patent No.: US 11,902,476 B2
(45) Date of Patent: Feb. 13, 2024

(54) INSPECTION DEVICE, PRINTER, AND METHOD TO INSPECT IMAGES ACCURATELY

(71) Applicant: BROTHER KOGYO KABUSHIKI KAISHA, Nagoya (JP)

(72) Inventor: Hiroto Takahashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/729,302

(22) Filed: Apr. 26, 2022

(65) Prior Publication Data

US 2022/0353376 A1 Nov. 3, 2022

(30) Foreign Application Priority Data

Apr. 28, 2021 (JP) ................. 2021-076076

(51) Int. Cl.
*H04N 1/60* (2006.01)
*H04N 1/00* (2006.01)
*G06K 15/02* (2006.01)

(52) U.S. Cl.
CPC ....... *H04N 1/00045* (2013.01); *G06K 15/024* (2013.01)

(58) Field of Classification Search
CPC .......... H04N 1/00034; G06K 7/10732; G06K 7/10722
USPC ....... 358/1.14, 3.26, 504, 509, 461
See application file for complete search history.

(56) References Cited

U.S. PATENT DOCUMENTS

| | | | | |
|---|---|---|---|---|
| 8,575,861 | B1* | 11/2013 | Gordin | H05B 47/22 |
| | | | | 315/307 |
| 2005/0134923 | A1* | 6/2005 | Kim | H04N 1/40006 |
| | | | | 358/461 |
| 2006/0285174 | A1* | 12/2006 | Jeon | H04N 1/40006 |
| | | | | 358/461 |
| 2013/0293905 | A1* | 11/2013 | Odaira | H04N 1/6033 |
| | | | | 358/1.9 |

FOREIGN PATENT DOCUMENTS

| | | |
|---|---|---|
| JP | 2002-255397 A | 9/2002 |
| JP | 2005-320148 A | 11/2005 |
| JP | 2010-177745 A | 8/2010 |
| JP | 2012-252039 A | 12/2012 |

* cited by examiner

*Primary Examiner* — Jamares Q Washington
(74) *Attorney, Agent, or Firm* — Baker Botts L.L.P.

(57) ABSTRACT

An inspection device includes a reader including a light source and a light receiving element, a white reference section, a memory storing reference data of a white pixel value, and a controller. The controller is configured to cause the light source to emit light toward the white reference section, and receive a pixel signal output from the reader when the light receiving element receives reflected light from the white reference section, determine a rate of decrease in a pixel value relative to the reference data, based on the received pixel signal, when the rate of decrease is equal to or higher than a first threshold, output an instruction signal concerning an instruction to clean the reader, re-determine the rate of decrease in response to receiving input of a completion signal concerning completion of cleaning of the reader, and update the reference data using the re-determined rate of decrease.

12 Claims, 9 Drawing Sheets

INSPECTION DEVICE, PRINTER, AND METHOD TO INSPECT IMAGES ACCURATELY

CROSS REFERENCE TO RELATED APPLICATIONS

This application claims priority under 35 U.S.C. § 119 from Japanese Patent Application No. 2021-076076 filed on Apr. 28, 2021. The entire subject matter of the application is incorporated herein by reference.

BACKGROUND

Heretofore, a type of printer has been known that is configured to use a roll of long continuous sheet and print images in printing areas arranged along a longitudinal direction on the continuous sheet.

In some printers of this type, the image printed in each printing area is inspected. Such a printer includes a reader disposed downstream of a print head in a conveyance direction of the continuous sheet, and determines, after an image printed by the print head is read by the reader, whether the image has been printed with a desired level of quality based on the read image data.

SUMMARY

In the known configuration as above, the reader may become dirty. For instance, when an inkjet printing system is employed for the print head, the reader may become stained due to ink transferring to the reader or ink mist adhering to the reader when a printing area with the ink not yet dried comes into contact with the reader. The reader, if stained, is unable to properly read or accurately inspect the printed image.

Aspects of the present disclosure are advantageous to provide one or more improved techniques that make it possible for an inspection device and a printer to inspect images accurately.

According to aspects of the present disclosure, an inspection device is provided, which includes a reader, a white reference section, a memory, and a controller. The reader includes a light source and a light receiving element. The memory stores reference data of a white pixel value. The controller is configured to cause the light source to emit light toward the white reference section, and receive a pixel signal output from the reader when the light receiving element receives reflected light from the white reference section. The pixel signal is concerning a pixel value according to a light quantity of the reflected light received by the light receiving element. The controller is further configured to determine a rate of decrease in the pixel value relative to the reference data, based on the received pixel signal. The controller is further configured to, when the rate of decrease is equal to or higher than a first threshold, output an instruction signal concerning an instruction to clean the reader. The controller is further configured to, after outputting the instruction signal, re-determine the rate of decrease in response to receiving input of a completion signal concerning completion of cleaning of the reader. The controller is further configured to update the reference data using the re-determined rate of decrease.

According to aspects of the present disclosure, further provided is a printer that includes a conveyor, a print head, a reader, a white reference section, a memory, and a controller. The conveyor is configured to convey a printing medium in a conveyance direction. The print head is configured to perform printing on the printing medium. The reader includes a light source and a light receiving element. The reader is disposed downstream of the print head in the conveyance direction. The memory stores reference data of a white pixel value. The controller is configured to cause the light source to emit light toward the white reference section, and receive a pixel signal output from the reader when the light receiving element receives reflected light from the white reference section. The pixel signal is concerning a pixel value according to a light quantity of the reflected light received by the light receiving element. The controller is further configured to determine a rate of decrease in the pixel value relative to the reference data, based on the received pixel signal. The controller is further configured to, when the rate of decrease is equal to or higher than a first threshold, output an instruction signal concerning an instruction to clean the reader. The controller is further configured to, after outputting the instruction signal, re-determine the rate of decrease in response to receiving input of a completion signal concerning completion of cleaning of the reader. The controller is further configured to update the reference data using the re-determined rate of decrease.

According to aspects of the present disclosure, further provided is a method implementable on an inspection device. The inspection device includes a reader including a light source and a light receiving element, a white reference section, and a memory storing reference data of a white pixel value. The method includes causing the light source to emit light toward the white reference section, and receive a pixel signal output from the reader when the light receiving element receives reflected light from the white reference section. The pixel signal is concerning a pixel value according to a light quantity of the reflected light received by the light receiving element. The method further includes determining a rate of decrease in the pixel value relative to the reference data, based on the received pixel signal. The method further includes outputting, when the rate of decrease is equal to or higher than a first threshold, an instruction signal concerning an instruction to clean the reader. The method further includes re-determining, after outputting the instruction signal, the rate of decrease in response to receiving input of a completion signal concerning completion of cleaning of the reader. The method further includes updating the reference data using the re-determined rate of decrease.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

An illustrative embodiment according to aspects of the present disclosure will be described with reference to the accompanying drawings.

<Overall Configuration of Label Printer>

Figure 1:
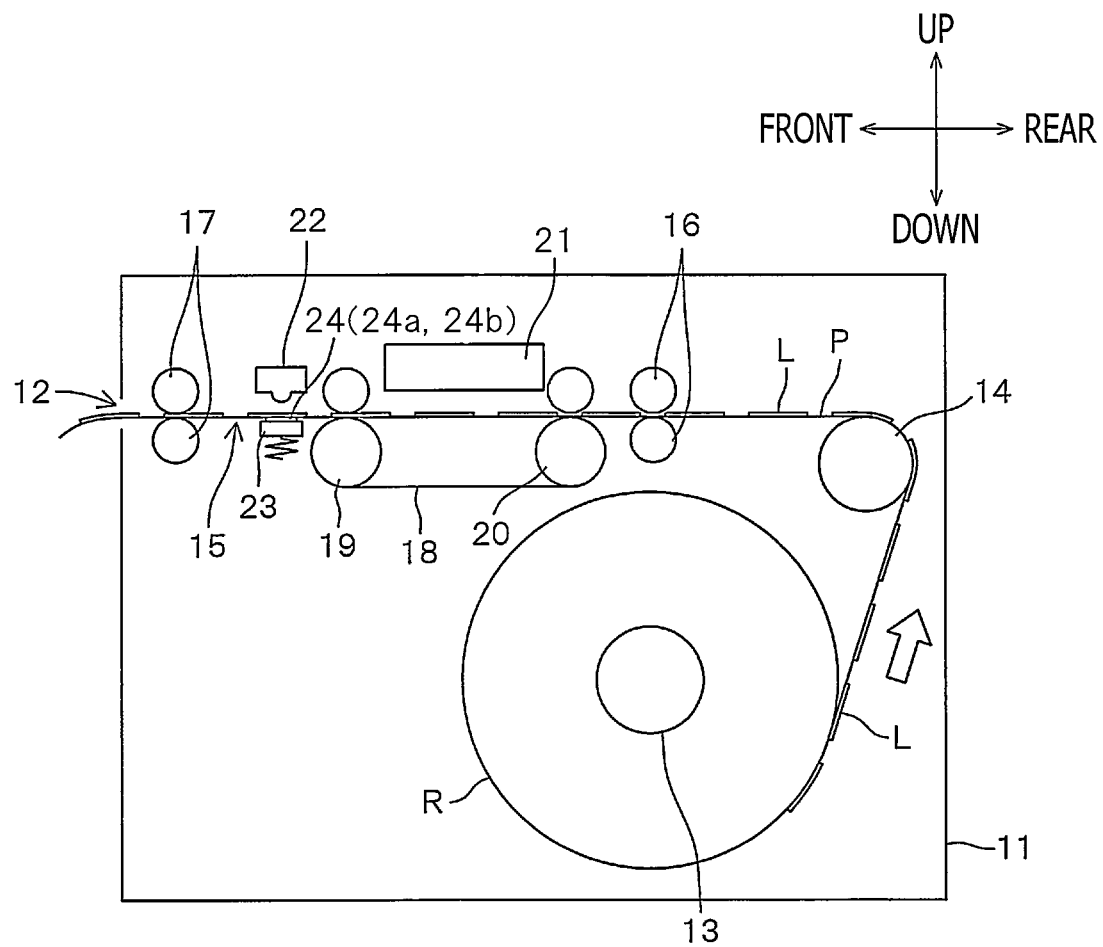
FIG. 1 is a cross-sectional side view schematically showing a configuration of a label printer.

As shown in FIG. 1, a label printer 1 is configured to print images on a long continuous sheet P. A printed section of the continuous sheet P is discharged from a discharge port 12. The discharge port 12 is formed at a side of a housing 11 that forms an outer shell of the label printer 1.

In the following description, front, rear, left, right, upper, and lower sides of the label printer 1 will be defined as below. The front side is a side at which the discharge port 12 is formed. The rear side is a back side opposite to the front side. The left side and the right side are defined as a left-hand side and a right-hand side when the label printer 1 is viewed from the front side, respectively. Moreover, the upper side and the lower side are defined based on a state where the label printer 1 is installed on a horizontal surface. FIG. 1 shows a cross-section of the label printer 1 taken along a cutting plane perpendicular to the left-right direction and viewed from the right side.

For instance, the continuous sheet P may be die-cut paper on which labels L are attached in line along a longitudinal direction on a long mount. In another instance, the continuous sheet P may be indefinite long paper (i.e., continuous paper) on which base images are previously printed to set printing areas at regular intervals on a printing surface of long plain paper. In yet another instance, the continuous sheet P may be indefinite long paper with no base images printed on a printing surface of long plain paper. On the die-cut paper, there is a printing area on a printing surface opposite to an adhesive side of each label L. The following description will be provided in an example case where the continuous sheet P is the die-cut paper.

The discharge port 12 is a rectangular opening extending in the left-right direction and connecting the inside and the outside of the housing 11. Namely, the inside of the housing 11 is communicated with the outside thereof through the discharge port 12.

A roll holder 13 is disposed in the housing 11. The roll holder 13 is configured to hold the continuous sheet P in the state of a roll R. In the state of the roll R, the continuous sheet P is wound around a roll core with the printing surface facing outward. The roll holder 13 is formed substantially in a cylindrical shape. The roll R is held by the roll holder 13 with the roll core being fitted around the roll holder 13.

In the housing 11, a direction change roller 14 is disposed on an upper rear side of the roll holder 13. In front of the direction change roller 14, there is a conveyance path 15 along which the continuous sheet P is conveyed. The conveyance path 15 extends forward from a position above the direction change roller 14. A front end of the conveyance path 15 is connected with the discharge port 12. The continuous sheet P is pulled out from the roll R and fed toward a rear side of the direction change roller 14. Then, the continuous sheet P is fed along an outer circumferential surface of the direction change roller 14, to change a feeding direction of the continuous sheet P to a forward direction. Further, the continuous sheet P is conveyed forward along the conveyance path 15 toward the discharge port 12.

Along the conveyance path 15, there are conveyance rollers 16 configured to convey the continuous sheet P. The conveyance rollers 16 are spaced apart forward from the direction change roller 14. In addition, conveyance rollers 17 are disposed on a rear side of the discharge port 12 and spaced apart forward from the conveyance rollers 16. Furthermore, a conveyance belt 18 is provided between the conveyance rollers 16 and the conveyance rollers 17 in the front-rear direction. The conveyance belt 18 is wound around a driving roller 19 and a driven roller 20, which are spaced apart from each other in the front-rear direction. The conveyance belt 18 is disposed with an upward-facing outer surface thereof extending along the conveyance path 15, below the conveyance path 15.

When the continuous sheet P is passed between the conveyance rollers 16, and a power from a motor M (see FIG. 2) rotating forward is transmitted to the conveyance rollers 16 and the driving roller 19, thereby rotating the conveyance rollers 16 and the driving roller 19, and the conveyance belt 18 is rotated by the rotation of the driving roller 19, the continuous sheet P is conveyed in a feed-out direction toward the discharge port 12 along the conveyance path 15. The feed-out direction is one direction parallel to an arrangement direction along which the labels L are arranged. The feed-out direction may be referred to as a "conveyance direction." A transmission path of the driving power from the motor M is connected with the roll holder 13 as well. When a power from the motor M rotating backward is transmitted to the roll holder 13, the roll holder 13 is rotated in an opposite direction to the rotating direction when the continuous sheet P is conveyed in the feed-out direction, and the roll R is rotated integrally with the roll holder 13, the continuous sheet P is conveyed in a pull-back direction opposite to the feed-out direction.

Further, when the continuous sheet P being conveyed by the conveyance rollers 16 is decelerated and stopped, the roll holder 13 is driven to rotate forward or backward by the driving force from the motor M, to adjust an inertia force acting on the roll R. The direction change roller 14 is configured to apply tension to the continuous sheet P between the roll holder 13 and the conveyance rollers 16. Further, a mechanism configured to detect the tension applied to the continuous sheet P is provided for the direction change roller 14.

Between the conveyance rollers 16 and the conveyance rollers 17, a printing head 21 and a CIS ("CIS" is an abbreviation of "Contact Image Sensor") unit 22 are arranged in line in this order in the feed-out direction.

The print head 21 is disposed to face the upward-facing outer surface of the conveyance belt 18 across the conveyance path 15. For instance, the print head 21 is configured to print, in a printing position, an image on the printing surface of the continuous sheet P being conveyed along the conveyance path 15 in an inkjet recording method. The printing position of the print head 21 is a particular distance downstream away from an upstream end of the print head 21 in the feed-out direction.

The CIS unit 22 is disposed downstream of the print head 21 in the feed-out direction, to face the conveyance path 15 from above. The CIS unit 22 is for reading an object to be read (hereinafter referred to as a "reading target") in a reading position. Specifically, the CIS unit 22 incorporates a light source 36 (see FIG. 2), a rod lens array (not shown), and a linear image sensor (not shown). The CIS unit 22 is configured to emit a line of light from the light source 36 to the reading target located in the reading position and to receive reflected light from the reading target by the linear image sensor through the rod lens array. Thereby, the reading target is read for a single line along a width direction in the reading position of the CIS unit 22. The linear image sensor includes a plurality of light receiving elements 37 arranged in a row along the width direction. Image data read by each light receiving element 37 corresponds to image data (i.e., a pixel value) of one pixel. The width direction is orthogonal to the feed-out direction and the pull-back direction for the continuous sheet P along the conveyance path 15, and extends parallel to the conveyance path 15. Namely, the width direction is parallel to the left-right direction.

In addition, a pressing member 23 is disposed in a position to face the CIS unit 22 across the conveyance path 15. The pressing member 23 is configured to press the continuous sheet P against the CIS unit 22. A black-and-white reference member 24 is provided on an upper surface of the pressing member 23. The black-and-white reference member 24 is formed as a rectangular tape. The black-and-white reference member 24 is attached to the upper surface of the pressing member 23 in such a manner as to extend in the width direction in the reading position of the CIS unit 22. The black-and-white reference member 24 includes a white reference section 24a and black reference sections 24b. The black reference sections 24b are black areas at two end portions of the black-and-white reference member 24 in the width direction. The white reference section 24a is a remaining white area sandwiched by the black reference sections 24b.

<Main Part of Electrical Configuration>

Figure 2:
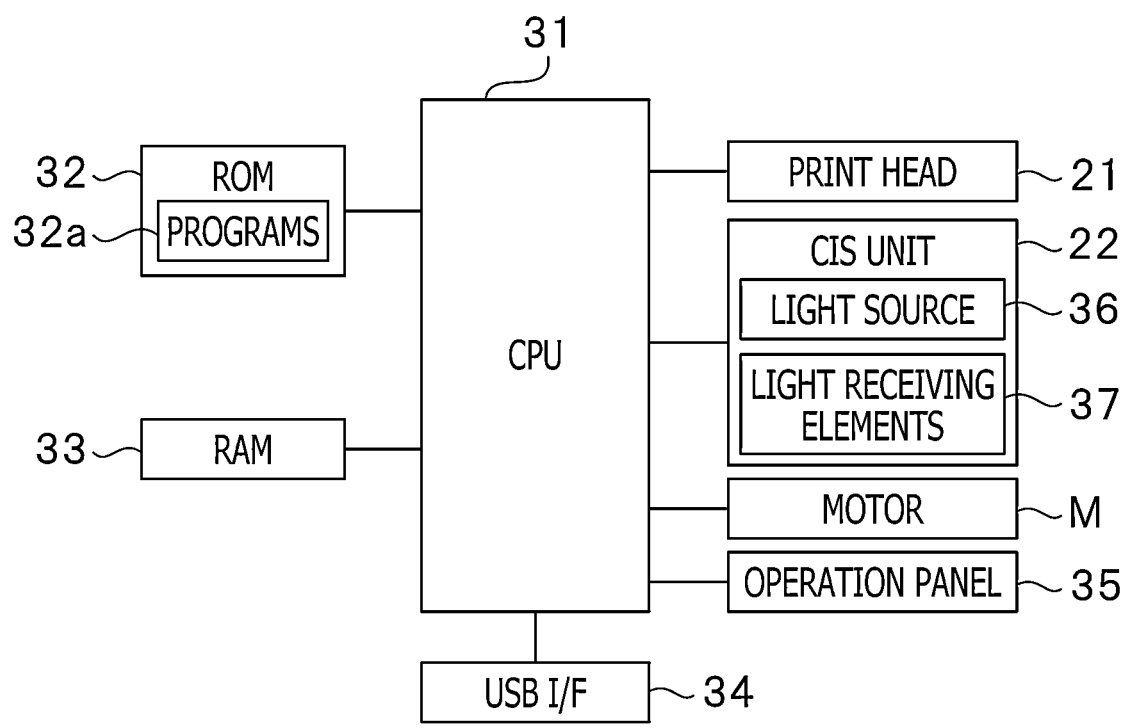
FIG. 2 is a block diagram showing an electrical configuration of the label printer.

As shown in FIG. 2, the label printer 1 includes a CPU ("CPU" is an abbreviation for "Central Processing Unit") 31, a ROM ("ROM" is an abbreviation for "Read Only Memory") 32, and a RAM ("RAM" is an abbreviation for "Random Access Memory") 33.

The CPU 31 is configured to execute programs for various processes, thereby controlling operations of the print head 21, the CIS unit 22, and the motor M. The CIS unit 22 includes an AFE ("AFE" is an abbreviation for "Analog Front End") configured to amplify an analog signal output from the linear image sensor of the CIS unit 22 and convert the analog signal into a digital signal. The image data, which is the digital signal after the conversion by the AFE, is input into the CPU 31.

The ROM 32 is a rewritable non-volatile memory such as a flash memory. The ROM 32 stores various types of data and programs 32a executable by the CPU 31. The CPU 31 may perform the following processes as shown in FIGS. 3, 4A to 4E, and 6 by executing the programs 32a. In other words, the CPU 31 and the ROM 32 storing the programs 32a may form a controller to control operations by the label printer 1.

The RAM 33 is a volatile memory such as s DRAM ("DRAM" is an abbreviation for "Dynamic Random Access Memory"). The RAM 33 is used as a work area when the CPU 31 executes programs 32a.

In addition, an encoder is provided for the motor M. The CPU 31 receives, from the encoder, an encoder signal which is a pulse signal synchronized with the rotation of the motor M. The RAM 33 is used by the CPU 31 as a step counter. The CPU 31 is configured to count, using the step counter, the number of pulses of the encoder signal output from the encoder while the motor M is rotating forward and the number of pulses of the encoder signal output from the encoder while the motor M is rotating backward, thereby grasping the position of the continuous sheet P.

The label printer 1 further includes a USB I/F ("I/F" is an abbreviation for "interface") 34. The USB I/F 34 is an interface for data communication with USB devices such as a USB memory. The USB I/F 34 includes a USB connector to which a USB cable is connected, and a USB controller configured to control USB connection with a USB device.

The label printer 1 further includes an operation panel 35. The operation panel 35 includes an operable section to be operated for various settings and a display to show information. The operable section and the display may be provided separately. In another instance, the operable section and the display may be integrated as a touch panel with the operable section (e.g., a pressure-sensitive or electrostatic capacitive transparent film switch) overlaid on the display (e.g., a liquid crystal display).

<Advance Preparation Process>

Figure 3:
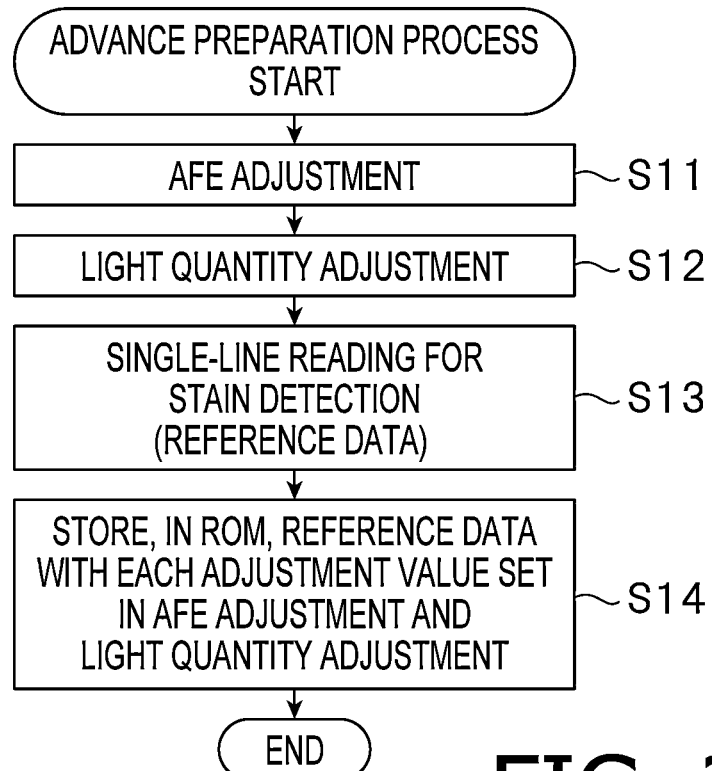
FIG. 3 is a flowchart showing a procedure of an advance preparation process.

Prior to factory shipment of the label printer 1, the CPU 31 performs an advance preparation process shown in FIG. 3.

In the advance preparation process, the CPU 31 performs AFE adjustment (S11). In the AFE adjustment, the CPU 31 controls the CIS unit 22 to read the black reference sections 24b of the black-and-white reference member 24. Then, the CPU 31 sets an adjustment value to adjust an offset quantity of a digital signal obtained through A/D conversion of an analog signal (i.e., a voltage) output from each light receiving element 37 of the CIS unit 22, in such a manner that the minimum value of image data (i.e., pixel values) obtained by the CIS unit 22 reading the black reference sections 24b becomes a specified value (e.g., 1).

In addition, the CPU 31 performs light quantity adjustment (S12). In the light quantity adjustment, the CPU 31 controls the CIS unit 22 to read the white reference section 24a of the black-and-white reference member 24. Then, the CPU 31 adjusts the value of an electric current to be supplied to the light source 36 of the CIS unit 22, the duty ratio of a lighting time for the light source 36 to emit the light, and the gain of the linear image sensor, in such a manner that the maximum value of image data (i.e., pixel values) obtained by the CIS unit 22 reading the white reference section 24a becomes a specified value (e.g., 254).

Then, the CPU 31 causes the CIS unit 22 after the AFE adjustment and the light quantity adjustment, to read the black-and-white reference member 24 (S13: Single-line reading for stain detection). Thereby, image data is obtained for a single line of the black-and-white reference member 24 read by the CIS unit 22. Afterward, in S14, the CPU 31 extracts read image data of the white reference section 24a from the image data for the single line of the black-and-white reference member 24 read by the CIS unit 22. Further, in S14, the CPU 31 stores the extracted image data as reference data in association with each adjustment value set in the AFE adjustment and the light quantity adjustment, into the ROM 32, <Device Adjustment Process>

For instance, when a USB memory that stores print data is connected with the USB I/F 34 (more specifically, with the USB connector of the USB interface), and a print start button on the operation panel 35 is pressed, the label printer 1 performs printing according to the image data stored in the USB memory. In addition, the label printer 1 performs an inspection of an image printed on a label L. In the inspection, the label printer 1 causes the CIS unit 22 to read the image printed on the label L, and determines quality of the printed image (i.e., determines whether the image has been printed with a desired level of quality) based on the read image data.

Prior to the start of printing, the user sets the continuous sheet P in such a manner that a first label L is positioned upstream of the print head 21 in the feed-out direction. At this time, the continuous sheet P does not exist in the reading position of the CIS unit 22, and therefore the CIS unit 22 is allowed to read the black-and-white reference member 24.

Before starting printing, the CPU 31 performs a device adjustment process shown in FIGS. 4A to 4E.

Figure 4A:
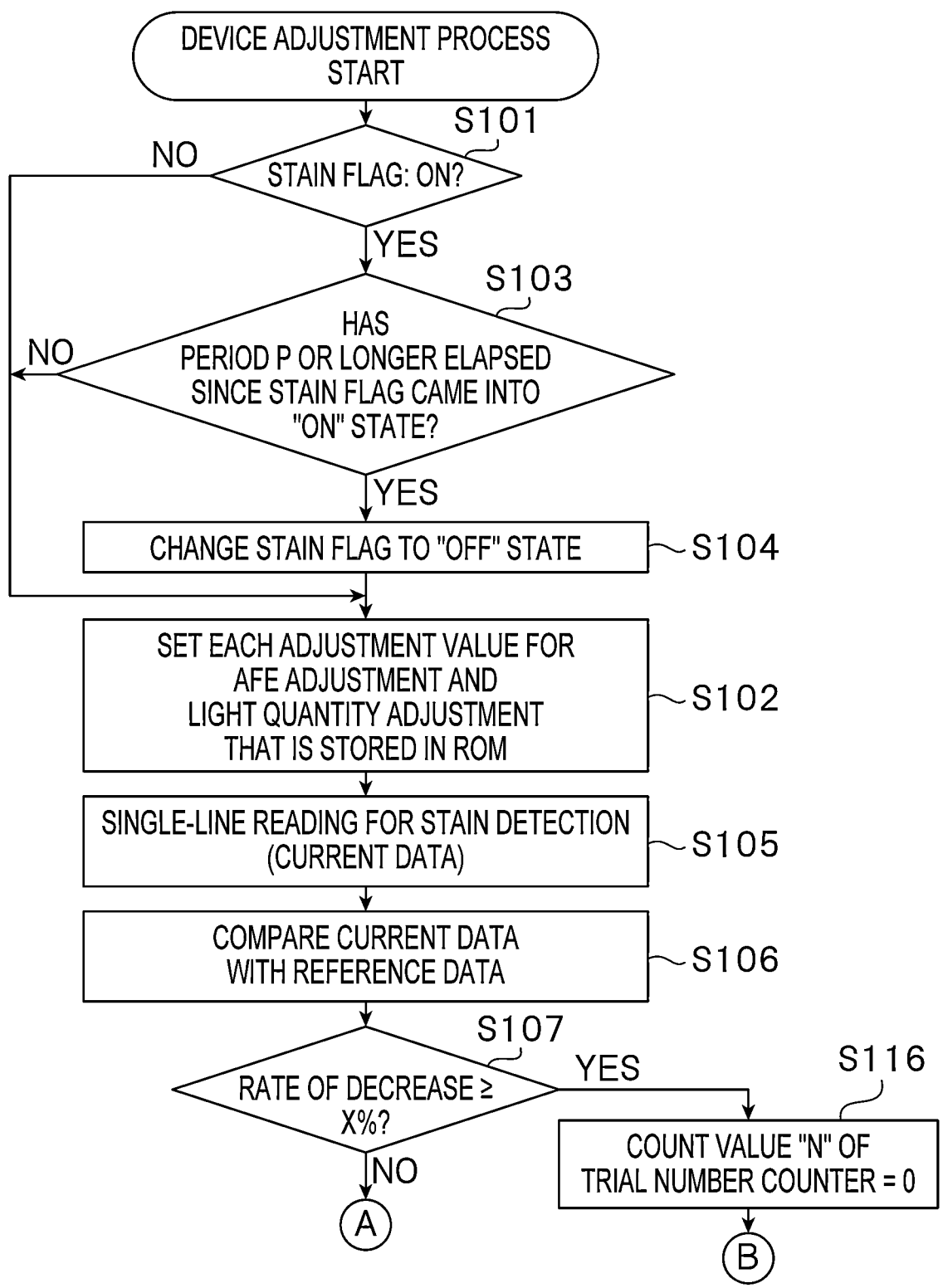
FIGS. 4A, 4B, 4C, 4D, and 4E are flowcharts showing a procedure of a device adjustment process.
Figure 4B:
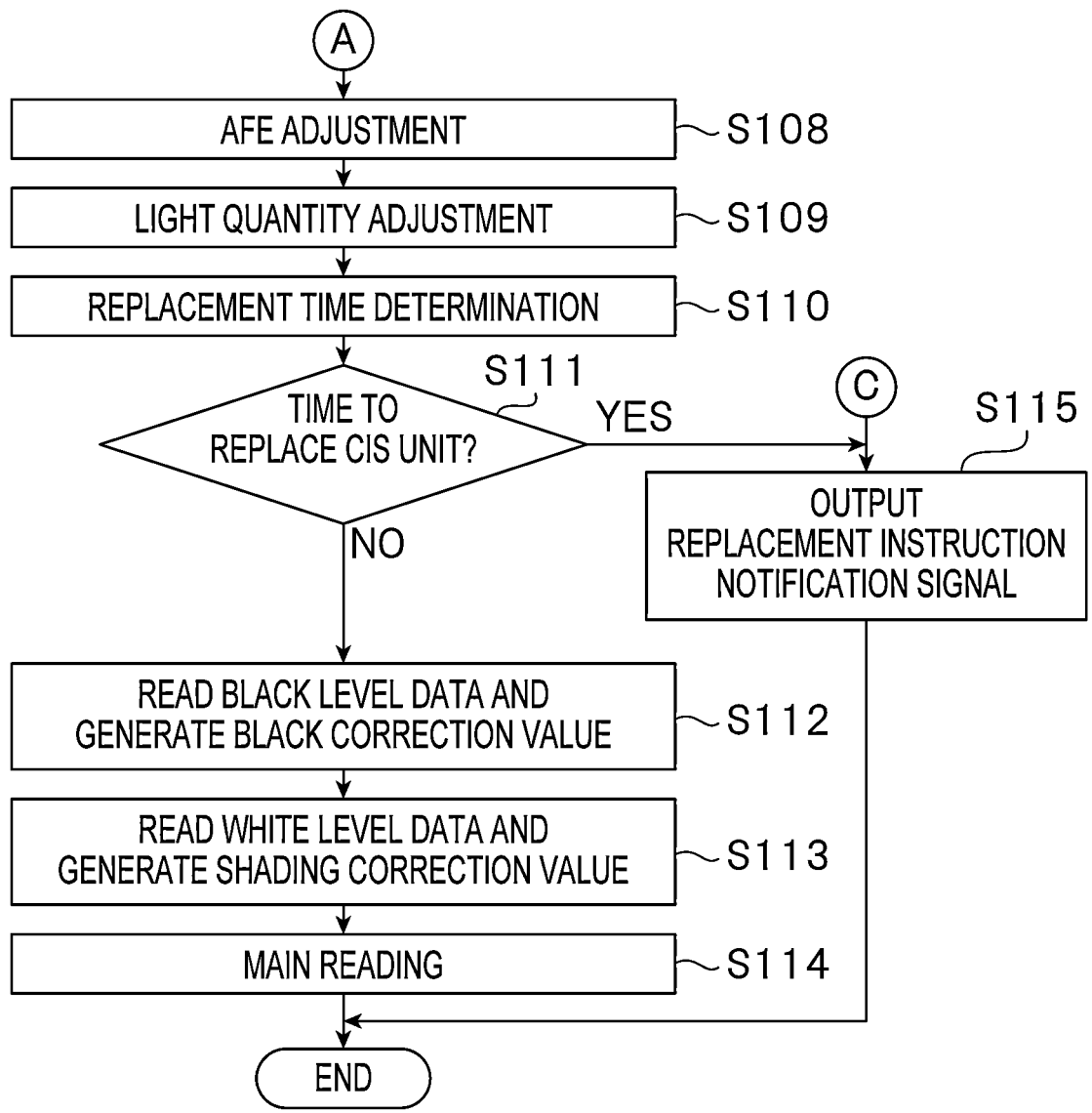

In the device adjustment process, the CPU 31 determines whether the state of a stain flag set in the ROM 32 is "ON" (S101 in FIG. 4A). The stain flag indicates that a threshold used for determining a below-mentioned rate of decrease has been updated.

When determining that the state of the stain flag is not "ON" (i.e., when the state of the stain flag is "OFF") (S101: No), the CPU 31 sets, for the CIS unit 22, each adjustment value for the AFE adjustment and the light quantity adjustment that are stored in the ROM 32 (S102).

When the status of the stain flag is "ON" (S101: Yes), the CPU 31 determines whether a particular period P or longer has elapsed since the state of the stain flag became "ON" (S103). When the state of the stain flag is switched from "OFF" to "ON," the date and time at that point in time are stored in the ROM 32 (time stamp recording). In the illustrative embodiment, for instance, the period P is set to one week.

When determining that the period P or longer has not elapsed since the state of the stain flag became "ON" (S103: No), the CPU 31 sets, for the CIS unit 22, each adjustment value for the AFE adjustment and the light quantity adjustment without changing the current state "ON" of the stain flag (S102). Meanwhile, when determining that the period P or longer has elapsed since the state of the stain flag became "ON" (S103: Yes), the CPU 31 changes the state of the stain flag from "ON" to "OFF" (S104), and then sets, for the CIS unit 22, each adjustment value for the AFE adjustment and the light quantity adjustment that are stored in the ROM 32 (S102).

After setting the respective setting values for the AFE adjustment and the light quantity adjustment for the CIS unit 22, the CPU 31 causes the CIS unit 22 to read the black-and-white reference member 24 (S105: Single-line reading for stain detection). Thereby, the CPU 31 obtains image data for the read single line of the black-and-white reference member 24. The CPU 31 extracts, as current data, read image data of the white reference section 24a from the obtained image data for the single line of the black-and-white reference member 24. Then, the CPU 31 compares the current data with the reference data stored in the ROM 32 (S106), thereby determining the rate of decrease. Namely, the CPU 31 determines (calculates) the rate of decrease in a pixel value of the current data relative to a corresponding pixel value of the reference data, and determines whether the rate of decrease is equal to or higher than a threshold X % (S107). For instance, the threshold X is set to 10%.

Figure 5:
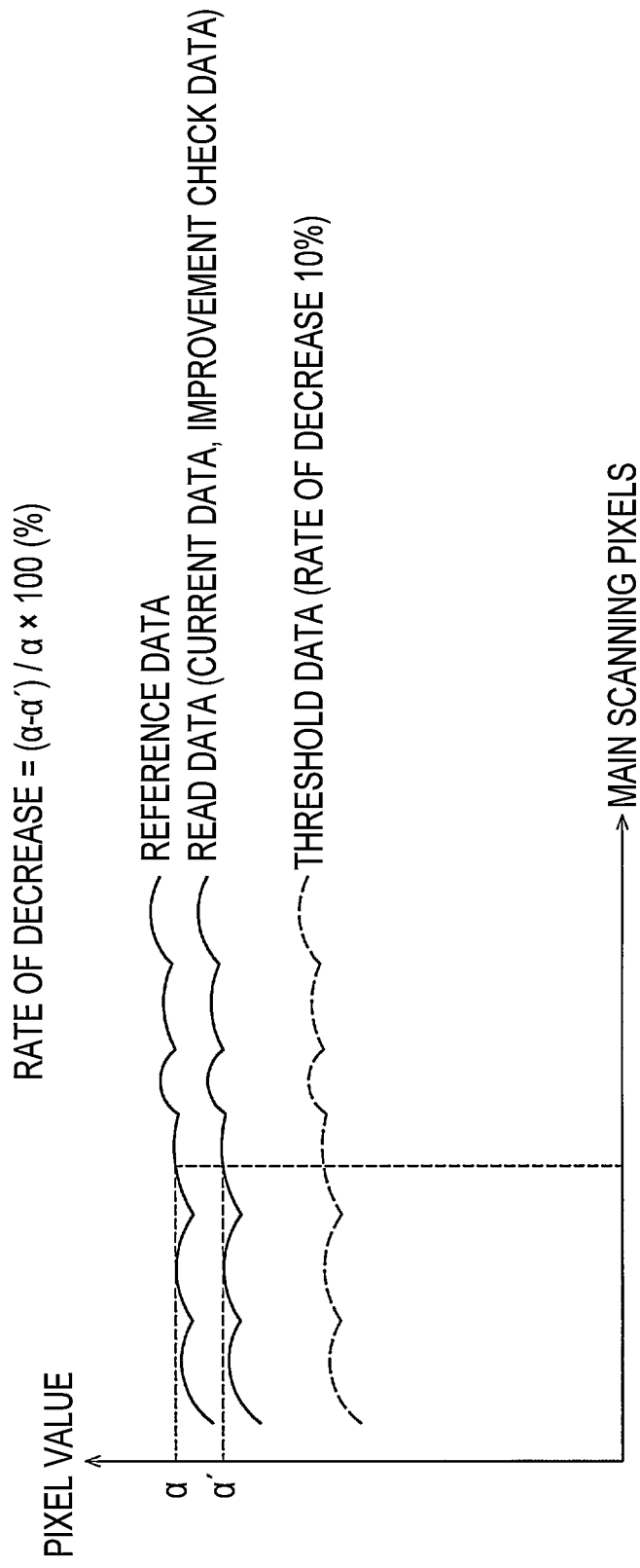
FIG. 5 schematically shows a relationship among reference data, read data, and threshold data for a single line of pixels (i.e., main scanning pixels).

The rate of decrease is the ratio (percentage) of an amount of decrease, by which a pixel value of the current data decreases from a corresponding pixel value of the reference data, to the corresponding pixel value of the reference data. More specifically, as shown in FIG. 5, when a pixel value of the reference data is a, and a corresponding pixel value of the current data is a', the rate of decrease is calculated by dividing a value obtained by subtracting the pixel value a' from the pixel value a by the pixel value a, and then multiplying the division value by 100. For instance, the rate of decrease may be calculated for each of all the pixels included in the current data and the reference data. In another instance, the rate of decrease may be calculated for a particular pixel specified from among all the pixels included in the current data and the reference data. In yet another instance, the rate of decrease may be calculated as a rate of decrease in an average value of all the pixel values included in the current data relative to an average value of all the pixel values included in the reference data.

When determining that the rate of decrease is not equal to or higher than the threshold X % (S107: No), the CPU 31 performs the AFE adjustment (S108 in FIG. 4B). In addition, the CPU 31 performs the light quantity adjustment (S109). The specific operations to be performed in the AFE adjustment and the light quantity adjustment are as in the above detailed description for the AFE adjustment and the light quantity adjustment in the advance preparation process.

After the light quantity adjustment, the CPU 31 determines when to replace the CIS unit 22 (replacement time determination) (S110). Specifically, the CPU 31 determines whether each of the adjustment values (i.e., the current value, the duty ratio, and the gain) for the light quantity adjustment is set to a corresponding maximum value, that is, whether a maximum value within an adjustable range of each adjustment value for the light quantity adjustment is applied. Then, when determining that each of the adjustment values for the light quantity adjustment is set to the corresponding maximum value, the CPU 31 determines that it is time to replace the CIS unit 22. Meanwhile, when determining that at least one of the adjustment values for the light quantity adjustment is not set to the corresponding maximum value, the CPU 31 determines that it is not time to replace the CIS unit 22.

When determining that it is not time to replace the CIS unit 22 (S111: No), the CPU 31 causes the CIS unit 22, for which the AFE adjustment and the light quantity adjustment have been made, to read the black-and-white reference member 24. Then, the CPU 31 reads black level data, which is read image data of the black reference sections 24b, from image data obtained by reading the black-and-white reference member 24, and generates a black correction value from the black level data (S112). Moreover, the CPU 31 reads white level data, which is read image data of the white reference section 24a, from the image data obtained by reading the black-and-white reference member 24, and generates a shading correction value from the white level data (S113). Afterward, the CPU 31 performs main reading to cause the CIS unit 22 to read an image printed on each label L (S114). Thereafter, the CPU 31 terminates the device adjustment process.

When determining that it is time to replace the CIS unit 22 (S111: Yes), the CPU 31 outputs a replacement instruction notification signal (S115). The replacement instruction notification signal is concerning a notification for providing an instruction to replace the CIS unit 22. When the replacement instruction notification signal is output, for instance, a display for instructing the replacement of the CIS unit 22 is shown on the display of the operation panel 35. In this case, the CPU 31 terminates the device adjustment process without performing the main reading.

On the other hand, when determining that the rate of decrease is equal to or higher than the threshold X % (S107: Yes), the CPU 31 resets, to 0, a count value N of a trial number counter that is set in the RAM 33 (S116). The period Q is set longer than the period P. For instance, the period Q is set to one year. When the reference data has never been updated, the CPU 31 determines whether the period Q or longer has elapsed since the reference data was stored into the ROM 32 in the advance preparation process.

Then, when determining that the period Q or longer has not elapsed since the update of the reference data (i.e., when the elapsed period since the update of the reference data is shorter than the period Q) (S117: No), the CPU 31 determines whether the state of the stain flag is "ON" (S118).

When determining that the state of the stain flag is not "ON" (i.e., when the state of the stain flag is "OFF") (S118: No), the CPU 31 increments by one the count value N of the trial number counter that is set in the RAM 33 (S119). The count value N of the trial number counter is reset to 0 at the start of the device adjustment process.

The CPU 31 determines whether the incremented count value N of the trial number counter is more than a second particular number of times (S120). For instance, the second particular number of times is 5. When determining that the incremented count value N of the trial number counter is not more than the second particular number of times (i.e., when the incremented count value N of the trial number counter is equal to or less than the second particular number of times) (S120: No), the CPU 31 outputs a first cleaning instruction notification signal (S121). The first cleaning instruction notification signal is concerning a notification for providing an instruction to clean (wipe off the stain on) a contact glass of the CIS unit 22. When the first cleaning instruction notification signal is output, an A-pattern notification is provided with a message such as "The reading mechanism is stained. Please wipe it off." being displayed on the display of the operation panel 35. In addition, a cleaning completion button is shown on the display of the operation panel 35. The cleaning completion button is configured to be pressed to input that the cleaning has been completed.

After outputting the first cleaning instruction notification signal, the CPU 31 determines whether the cleaning of the CIS unit 22 has been completed (S122). When the cleaning completion button has been pressed in response to the cleaning of the CIS unit 22 being completed, the CPU 31 receives a completion signal input via the operation panel 35. The completion signal is concerning completion of the cleaning of the CIS unit 22. In response to receipt of the completion signal input via the operation panel 35, the CPU 31 determines that the cleaning of the CIS Unit 22 has been completed. The CPU 31 does not proceed to a next step of the present process until the CPU 31 determines that the cleaning of CIS unit 22 has been completed.

When determining that the cleaning of the CIS unit 22 has been completed (S122: Yes), the CPU 31 causes the CIS unit 22 to read the black-and-white member 24 (S123: Single-line reading for stain detection). Then, the CPU 31 extracts, as improvement check data, the read image data of the white reference section 24a from the image data for the single line of the black-and-white reference member 24 read by the CIS unit 22. Afterward, the CPU 31 compares the improvement check data with the reference data stored in the ROM 32 (S124). Then, the CPU 31 determines a rate of decrease in the pixel value of the improvement check data relative to the corresponding pixel value of the reference data, and determines whether the determined rate of decrease is equal to or higher than the threshold X % (S125).

When determining that the rate of decrease is equal to or higher than the threshold X % (S125: Yes), the CPU 31 increments the count value N of the trial number counter by one (S119). Then, the CPU 31 determines again whether the incremented count value N is more than the second particular number of times (S120). When determining that the incremented count value N of the trial number counter is not more than the second particular number of times (i.e., when the incremented count value N of the trial number counter is equal to or less than the second particular number of times) (S120: No), the CPU 31 again outputs the first cleaning instruction notification signal (S121). Thereafter, when determining that the cleaning of the CIS unit 22 has been completed (S122: Yes), the CPU 31 causes the CIS unit 22 to read the black-and-white member 24 (S123). Then, as described above, the CPU extracts, as the improvement check data, the read image data of the white reference section 24a from the image data for the single line of the black-and-white reference member 24 read by the CIS unit 22, and compares the improvement check data with the reference data stored in the ROM 32 (S124). Thereafter, the CPU 31 determines the rate of decrease in the pixel value of the improvement check data relative to the corresponding pixel value of the reference data, and determines again whether the determined rate of decrease is equal to or higher than the threshold X % (S125).

Thus, the CPU 31 repeatedly performs the output of the first cleaning instruction notification signal and the determination as to the rate of decrease until the count value N of the trial number counter exceeds the second particular number of times. Then, when the count value N of the trial number counter exceeds the second particular number of times, the CPU 31 determines that the count value N of the trial number counter is more than the second particular number of times (S120: Yes), and outputs the replacement instruction notification signal (S115 in FIG. 4B). As described above, the replacement instruction notification signal is concerning the notification for providing the instruction to replace the CIS unit 22. Thereafter, the CPU 31 terminates the device adjustment process.

Before the count value N of the trial number counter exceeds the second particular number of times, when determining that the rate of decrease is not equal to or higher than the threshold X % (S125: No, in FIG. 4C), the CPU 31 switches the state of the stain flag from "OFF" to "ON" (S126). In addition, the CPU 31 stores the date and time at a point in time when the CPU 31 has switched the state of the stain flag to "ON" into the ROM 32 (time stamp recording).

Further, the CPU 31 stores the last-determined rate of decrease in the pixel value of the improvement check data relative to the corresponding pixel value of the reference data as a threshold Y % into the ROM 32 (S127).

Then, after the AFE adjustment (S108 in FIG. 4B) and the light quantity adjustment (S109), the CPU 31 performs the processes of S110 to S114 (i.e., the aforementioned replacement time determination in S110 and the subsequent steps S111 to S114). The CPU 31 proceeds to S114 to perform the main reading, and thereafter terminates the device adjustment process. Afterward, to newly perform printing, the CPU 31 starts the device adjustment process anew, and determines whether the status of the stain flag is "ON" (S101 in FIG. 4A). In this case, since the state of the stain flag is "ON," the CPU 31 determines whether the period P or longer has elapsed since the state of the stain flag became "ON" (S103). When determining that the period P or longer has not elapsed since the state of the stain flag became "ON" (S103: No), the CPU 31 sets, for the CIS unit 22, each adjustment value for the AFE adjustment and the light quantity adjustment without changing the current state "ON" of the stain flag (S102), and then causes the CIS unit 22 to read the black-and-white reference member 24 (S105). Thereafter, the CPU 31 performs the aforementioned rateof-decrease determination (S106, S107). Specifically, the CPU 31 compares the current data with the reference data stored in the ROM 32 (S106), thereby determining the rate of decrease. Namely, the CPU 31 determines the rate of decrease in the pixel value of the current data relative to the corresponding pixel value of the reference data, and determines whether the rate of decrease is equal to or higher than the threshold X % (S107). When determining that the rate of decrease is equal to or higher than the threshold X % (S107: Yes), the CPU 31 determines whether the period Q or longer has elapsed since the update of the reference data (S117 in FIG. 4C).

When determining that the period Q or longer has not elapsed since the update of the reference data (i.e., when the elapsed period of time since the update of the reference data is shorter than the period Q) (S117: No), the CPU 31 determines whether the state of the stain flag is "ON" (S118). At this time, the state of the stain flag is "ON." Therefore, the CPU 31 determines that the state of the stain flag is "ON" (S118: Yes), and increments by one the count value N of the trial number counter that is set in the RAM 33 (S 128 in FIG. 4D). Then, the CPU 31 determines whether the incremented count value N of the trial number counter is more than a third particular number of times (S129). For instance, the third particular number of times is 5.

When determining that the incremented count value N of the trial number counter is not more than the third particular number of times (i.e., when the incremented count value N of the trial number counter is equal to or less than the third particular number of times) (S129: No), the CPU 31 outputs a second cleaning instruction notification signal (S130). The second cleaning instruction notification signal is concerning a notification for providing an instruction to clean (wipe off the stain on) the contact glass of the CIS unit 22. When the second cleaning instruction notification signal is output, a B-pattern notification is provided with a message such as "The reading mechanism may be too stained to perform accurate detection. Please wipe it off carefully." being displayed on the display of the operation panel 35. Moreover, the cleaning completion button is shown on the display of the operation panel 35.

After outputting the second cleaning instruction notification signal, the CPU 31 determines whether the cleaning of the CIS unit 22 has been completed (S131). The CPU 31 does not proceed to a next step of the present process until the CPU 31 determines that the cleaning of CIS unit 22 has been completed.

When determining that the cleaning of CIS unit 22 has been completed (S131: Yes), the CPU 31 causes the CIS unit 22 to read the black-and-white reference member 24 (S 132: Single-line reading for stain detection). Afterward, the CPU 31 extracts, as improvement check data, read image data of the white reference section 24a from the image data for the single line of the black-and-white reference member 24 read by the CIS unit 22. Then, the CPU 31 compares the improvement check data with the reference data stored in the ROM 32 (S133). Further, the CPU 31 calculates a rate of decrease in the pixel value of the improvement check data relative to the corresponding pixel value of the reference data, and determines whether the rate of decrease is equal to or higher than the threshold Y % (S134). The threshold Y is the rate of decrease stored in the ROM 32 in S127. The threshold Y is set lower than the threshold X. For instance, the threshold Y is set to 7%.

When determining that the rate of decrease is equal to or higher than the threshold Y % (S134: Yes), the CPU 31 increments by one the count value N of the trial number counter (S128), and then determines again whether the count value N is more than the third particular number of times (S129). When determining that the count value N is not more than the third particular number of times (i.e., when the count value N is equal to or less than the third particular number of times) (S129: No), the CPU 31 again outputs the second cleaning instruction notification signal (S130). Thereafter, when determining that the cleaning of the CIS unit 22 has been completed (S131: Yes), the CPU 31 causes the CIS unit 22 to read the black-and-white reference member 24 (S132). Then, the CPU 31 compares the improvement check data with the reference data stored in the ROM 32 (S133). Further, the CPU 31 calculates a rate of decrease in the pixel value of the improvement check data relative to the corresponding pixel value of the reference data, and determines again whether the rate of decrease is equal to or higher than the threshold Y % (S134).

Thus, the CPU 31 repeatedly performs the output of the second cleaning instruction notification signal and the determination as to the rate of decrease until the count value N of the trial number counter exceeds the third particular number of times. Then, when the count value N of the trial number counter exceeds the third particular number of times, the CPU 31 determines that the count value N of the trial number counter is more than the third particular number of times (S129: Yes), and outputs the replacement instruction notification signal (S115 in FIG. 4B). As described above, the replacement instruction notification signal is concerning the notification for providing the instruction to replace the CIS unit 22. Thereafter, the CPU 31 terminates the device adjustment process.

When determining that the rate of decrease is not equal to or higher than the threshold Y % (S134: No, in FIG. 4D) before the count value N of the trial number counter exceeds the third particular number of times, the CPU 31 maintains the state of the stain flag to be "ON" and stores the current date and time in the ROM 32 (S126 in FIG. 4C, time stamp recording). Further, the CPU 31 stores the last-determined rate of decrease in the pixel value of the improvement check data relative to the corresponding pixel value of the reference data as the threshold Y % into the ROM 32 (S127). Then, after the AFE adjustment (S108 in FIG. 4B) and the light quantity adjustment (S109), the CPU 31 performs the processes of S110 to S114 (i.e., the aforementioned replacement time determination in S110 and the subsequent steps S111 to S114).

After newly starting the device adjustment process, when determining, in the determination as to the rate of decrease by comparing the current data with the reference data, that the rate of decrease is equal to or higher than the threshold X % (S107: Yes, in FIG. 4A), and determining that the period Q or longer has elapsed since the update of the reference data (S117: Yes, in FIG. 4C), the CPU 31 increments by one the count value N of the trial number counter that is set in the RAM 33 (S135 in FIG. 4E). Then, the CPU 31 determines whether the incremented count value N of the trial number counter is more than a first particular number of times (S136). For instance, the first particular number of times is 5.

When determining that the count value N of the trial number counter is not more than the first particular number of times (i.e., when the count value N of the trial number counter is equal to or less than the first particular number of times) (S136: No), the CPU 31 outputs a third cleaning instruction notification signal (S137). The third cleaning instruction notification signal is concerning a notification for providing an instruction to clean (wipe off the stain on) the contact glass of the CIS unit 22. When the third cleaning instruction notification signal is output, a C-pattern notification is provided with a message such as "Although there is a possibility that the reading mechanism may need to be replaced, please try wiping off the reading mechanism." being displayed on the display of the operation panel 35. In addition, on the display of the operation panel 35, the cleaning completion button is shown.

After outputting the third cleaning instruction notification signal, the CPU 31 determines whether the cleaning of the CIS unit 22 has been completed (S138). The CPU 31 does not proceed to a next step of the present process until the CPU 31 determines that the cleaning of the CIS unit 22 has been completed.

When determining that the cleaning of CIS unit 22 has been completed (S138: Yes), the CPU 31 causes the CIS unit 22 to read the black-and-white reference member 24 (S 139: Single-line reading for stain detection). Then, the CPU 31 extracts, as the improvement check data, the read image data of the white reference section 24a from the image data for the single line of the black-and-white reference member 24 read by the CIS unit 22. Afterward, the CPU 31 compares the improvement check data with the reference data stored in the ROM 32 (S140). Then, the CPU 31 determines a rate of decrease in the pixel value of the improvement check data relative to the corresponding pixel value of the reference data, and determines whether the determined rate of decrease is equal to or higher than a threshold Z % (S141). The threshold Z is lower than the thresholds X and Y. For instance, the threshold Z is set to 5%.

When determining that the rate of decrease is equal to or higher than the threshold Z % (S141: Yes), the CPU 31 increments by one the count value N of the trial number counter (S135), and then determines again whether the incremented count value N of the trial number counter is more than the first particular number of times (S136). When determining that the incremented count value N of the trial number counter is not more than the first particular number of times (i.e., when the incremented count value N of the trial number counter is equal to or less than the first particular number of times) (S136: No), the CPU 31 again outputs the third cleaning instruction notification signal (S137). Thereafter, when determining that the cleaning of the CIS unit 22 has been completed (S138: Yes), the CPU 31 causes the CIS unit 22 to read the black-and-white reference member 24 (S139). Then, the CPU 31 extracts, as the improvement check data, the read image data of the white reference section 24a from the image data for the single line of the black-and-white reference member 24 read by the CIS unit 22. Afterward, the CPU 31 compares the improvement check data with the reference data stored in the ROM 32 (S140). Then, the CPU 31 determines the rate of decrease in the pixel value of the improvement check data relative to the corresponding pixel value of the reference data, and determines again whether the determined rate of decrease is equal to or higher than the threshold Z % (S141).

Thus, the CPU 31 repeatedly performs the output of the third cleaning instruction notification signal and the determination as to the rate of decrease until the count value N of the trial number counter exceeds the first particular number of times. Then, when the count value N of the trial number counter exceeds the first particular number of times, the CPU 31 determines that the count value N of the trial number counter is more than the first particular number of times (S136: Yes), and stores the last-obtained improvement check data as new reference data into the ROM 32, thereby updating the reference data to the new reference data (S142).

In addition, when determining that the rate of decrease is not equal to or higher than the threshold Z % (S141: No) before the count value N of the trial number counter exceeds the first particular number of times, the CPU 31 stores the last-obtained improvement check data as new reference data into the ROM 32, thereby updating the reference data to the new reference data (S142).

Thereafter, the CPU 31 performs the AFE adjustment (S108 in FIG. 4B) and the light intensity adjustment (S109), and then performs the processes of S110 to S114 (i.e., the aforementioned replacement time determination in S110 and the subsequent steps S111 to S114).

<Operations and Advantageous Effects>

According to the configuration of the illustrative embodiment described above, the reference data indicating reference values of white pixel values is stored in the ROM 32. After setting each adjustment value for the AFE adjustment and the light intensity adjustment, the CPU 31 causes the CIS unit 22 to read the black-and-white reference member 24, and then extracts, as the current data, read image data of the white reference section 24a from the image data of the single line of the black-and-white reference member 24 obtained through the reading by the CIS unit 22. Afterward, the CPU 31 determines (calculates) the rate of decrease in the pixel value of the current data relative to the corresponding pixel value of the reference data. Then, when the rate of decrease is equal to or higher than the threshold X %, the CPU 31 outputs one of the first to third cleaning instruction notification signals concerning a notification for an instruction to clean the CIS unit 22. When the notification for the instruction to clean the CIS unit 22 is provided in accordance with the output one of the first to third cleaning instruction notification signals, the CIS unit 22 is cleaned in response to the instruction to clean the CIS unit 22. Thereby, if the CIS unit 22 is stained, the stain will be wiped off. Therefore, it is possible to cause the CIS unit 22 to properly read a target image. Thus, it is possible to accurately inspect the target image by using pixel values read by the CIS unit 22 and to appropriately determine whether the target image has been printed with a desired level of quality.

When the rate of decrease is equal to or higher than the threshold X %, and the elapsed period since the update of the reference data is shorter than the period Q, and the state of the stain flag is "OFF," the CPU 31 outputs the first cleaning instruction notification signal. Thereafter, when receiving input of the completion signal concerning completion of the cleaning of the CIS unit 22, the CPU 31 determines the rate of decrease again. When the re-determined rate of decrease has become lower than the threshold X % before the number of times the first cleaning instruction notification signal has been output exceeds the second particular number of times, the CPU 31 stores the last-determined rate of decrease as the threshold Y % into the ROM 32, and switches the state of the stain flag from "OFF" to "ON."

When the rate of decrease is equal to or higher than the threshold X %, and the elapsed period since the update of the reference data is shorter than the period Q, and the state of the stain flag is "ON," the CPU 31 outputs the second cleaning instruction notification signal. Thereafter, when receiving input of the completion signal concerning completion of the cleaning of the CIS unit 22, the CPU 31 determines the rate of decrease again. When the re-determined rate of decrease is equal to or higher than the threshold Y %, the CPU 31 again outputs the second cleaning instruction notification signal. When the re-determined rate of decrease has become lower than the threshold Y % before the number of times the second cleaning instruction notification signal has been output exceeds the third particular number of times, the CPU 31 maintains the current state "ON" of the stain flag, and stores the last-determined rate of decrease as the threshold Y % into the ROM 32.

Thereby, when the CIS unit 22 is stained, it is possible to prompt the user to wipe off the stain and to cause the CIS unit 22 to properly read the target image. In addition, when the stain on the CIS unit 22 is wiped off, and the rate of decrease is reduced to an improved value Y % which is lower than the threshold X %, the CPU 31 sets the improved value Y % as a new threshold. Thereby, it is possible to output the second cleaning instruction notification signal with a higher frequency and to prompt the user to clean the CIS unit 22 more frequently. As a result, it is possible to cause the CIS unit 22 to read the target image more properly and to inspect the target image more accurately.

When the number of times the first cleaning instruction notification signal has been output exceeds the second particular number of times, or the number of times the second cleaning instruction notification signal has been output exceeds the third particular number of times, the CPU 31 outputs the replacement instruction notification signal. Thereby, for instance, a display to provide an instruction to replace the CIS unit 22 is shown on the display of the operation panel 35. Thus, it is possible to instruct (prompt) the user to replace the CIS unit 22. In addition, it is possible to prevent the output of the first cleaning instruction notification signal or the second cleaning instruction notification signal from being repeated indefinitely. Moreover, it is possible to prevent the notification of the instruction to clean the CIS unit 22 from being repeated indefinitely.

When the rate of decrease is equal to or higher than the threshold X %, and the period Q or longer has elapsed since the update of the reference data, the CPU 31 outputs the third cleaning instruction notification signal. Thereafter, when receiving input of the completion signal concerning completion of the cleaning of the CIS unit 22, the CPU 31 determines (calculates) the rate of decrease again. When the re-determined rate of decrease is equal to or higher than the threshold Z %, the CPU 31 again outputs the third cleaning instruction notification signal. When the re-determined rate of decrease has become lower than the threshold Z % before the number of times the third cleaning instruction notification signal has been output exceeds the first particular number of times, the CPU 31 updates the reference data to the last-obtained improvement check data. Moreover, after the number of times the third cleaning instruction notification signal has been output reaches the first particular number of times, even when the re-determined rate of decrease is equal to or higher than the threshold Z %, the CPU 31 updates the reference data to the last-obtained improvement check data.

Since the reference data is updated, it is possible to prevent an instruction to clean the CIS unit 22 from being unnecessarily provided although the CIS unit 22 is not stained, for instance, when the decrease in the pixel value of the current data relative to the corresponding pixel value of the reference data is caused due to deterioration over time.

In addition, when the number of times the third cleaning instruction notification signal has been output reaches the first particular number of times, the reference data is updated with the improvement check data. Hence, it is possible to prevent the output of the third cleaning instruction notification signal from being repeated indefinitely. Thereby, it is possible to prevent the notification of the instruction to clean the CIS unit 22 in response to the third cleaning instruction notification signal from being repeated indefinitely.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of its versatility are shown and described in the present disclosure. It is to be understood that aspects of the present disclosure are capable of use in various other combinations and environments and are capable of changes or modifications within the scope of the inventive concept as expressed herein. For instance, the following modifications are feasible.

<Modifications>

Figure 4C:
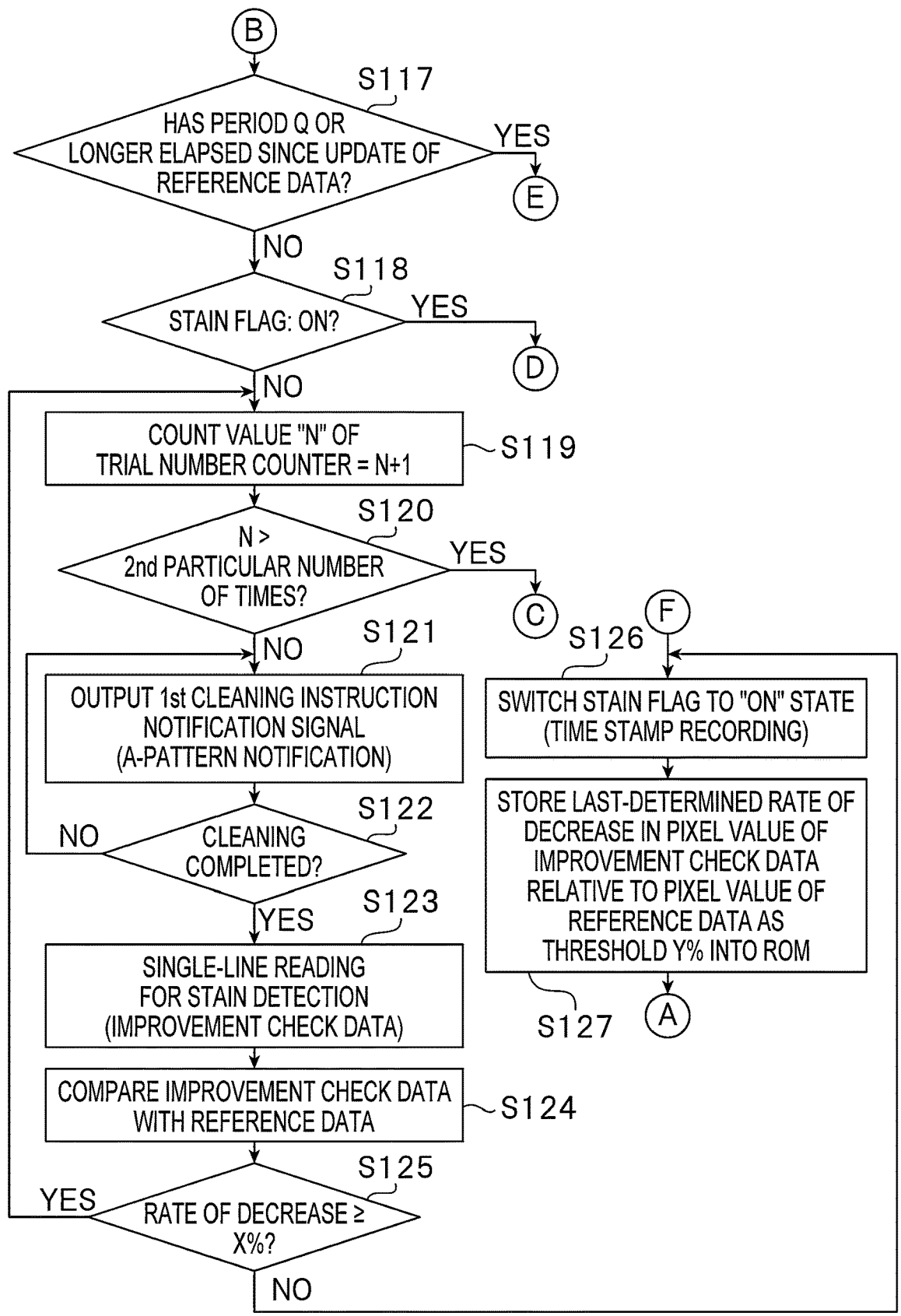
Figure 4D:
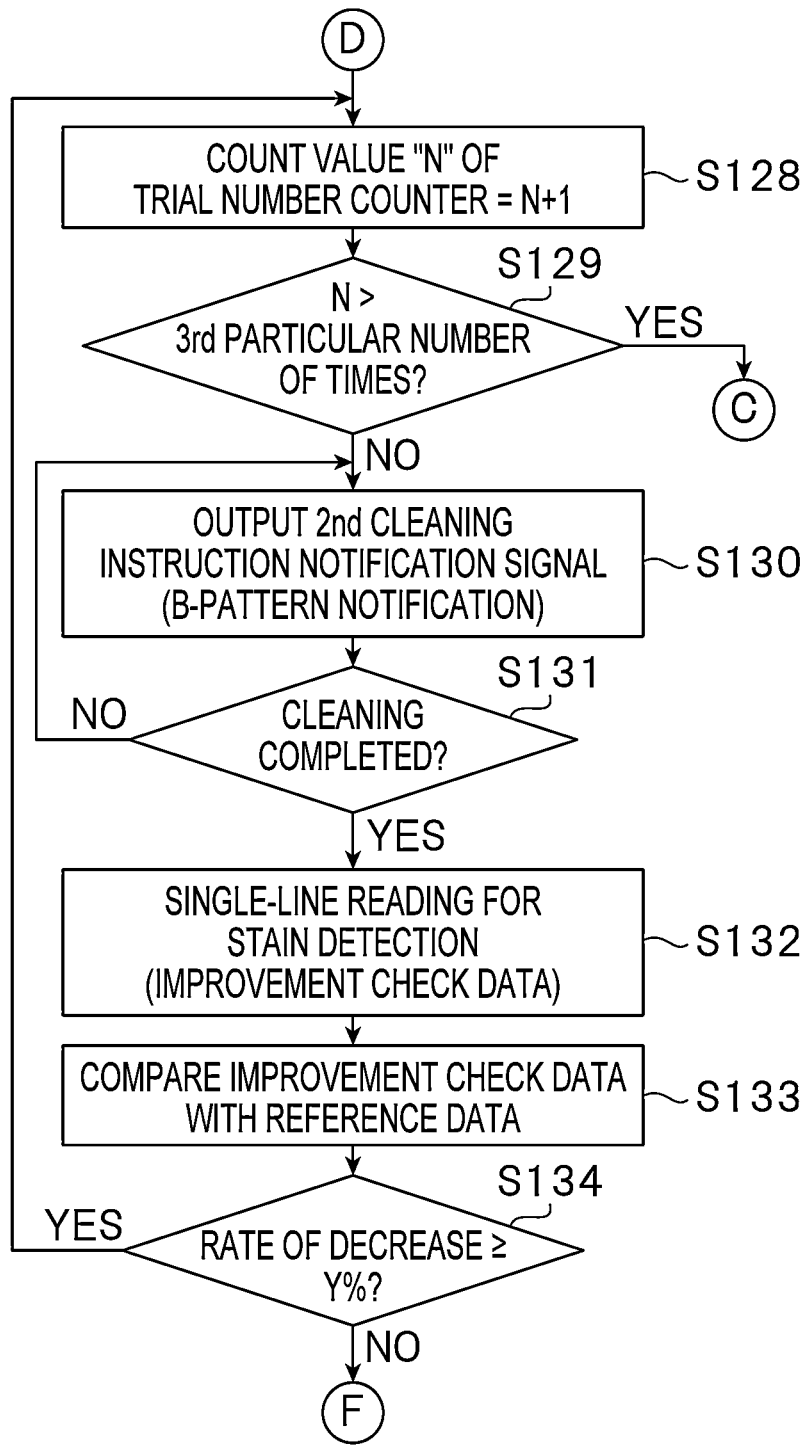
Figure 4E:
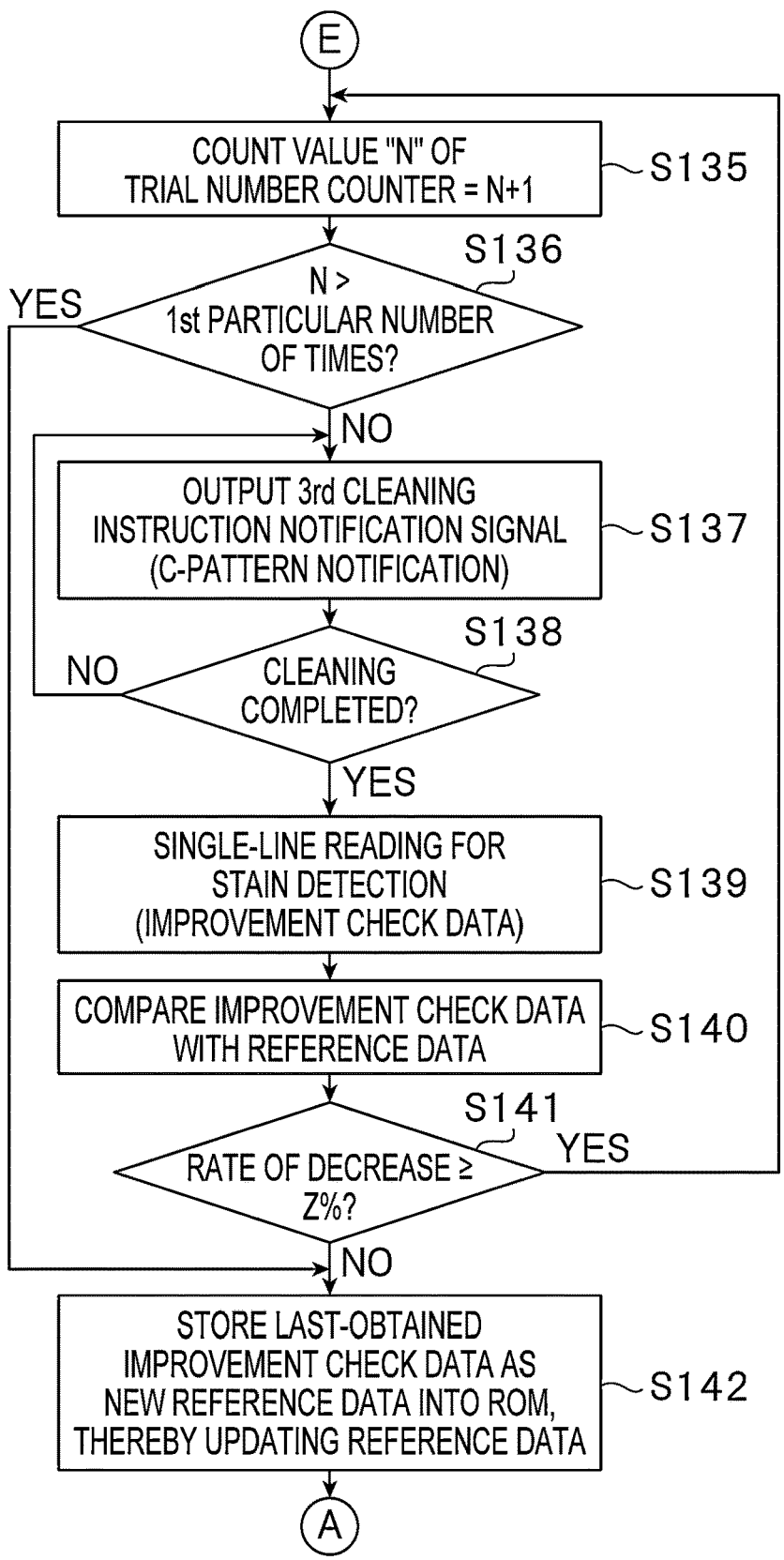
Figure 6:
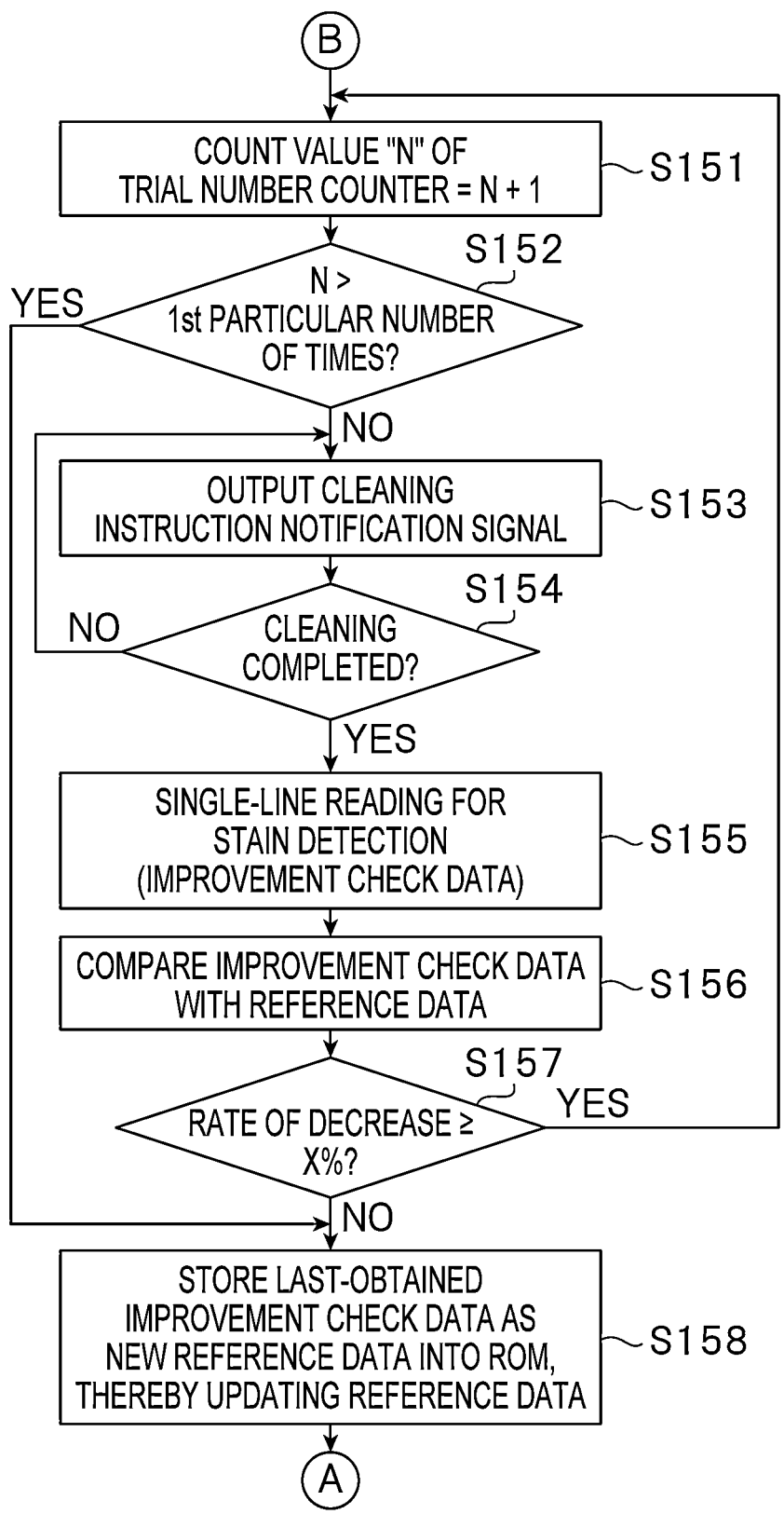
FIG. 6 is another example flowchart showing a partial procedure of the device adjustment process.

For instance, in the device adjustment process, instead of the steps S117 to S142 shown in FIGS. 4C, 4D, and 4E, the steps S151 to S158 shown in FIG. 6 may be executed.

Specifically, in the determination as to the rate of decrease based on the comparison of the current data with the reference data, when determining that the rate of decrease is equal to or higher than the threshold X % (S107: Yes, in FIG. 4A), the CPU 31 increments by one the count value N of the trial number counter that is set in the RAM 33 (S151 in FIG. 6). Then, the CPU 31 determines whether the incremented count value N of the trial number counter is more than the first particular number of times (e.g., 5) (S152).

When determining that the incremented count value N of the trial number counter is not more than the first particular number of times (i.e., when the incremented count value N of the trial number counter is equal to or less than the first particular number of times) (S152: No), the CPU 31 outputs a cleaning instruction notification signal (S153). The cleaning instruction notification signal is concerning a notification for providing an instruction to clean (wipe off the stain on) the contact glass of the CIS unit 22. When the cleaning instruction notification signal is output, a message such as "Please try wiping off the reading mechanism." is shown on the display of the operation panel 35. Further, the cleaning completion button is shown on the display of the operation panel 35.

After outputting the cleaning instruction notification signal, the CPU 31 determines whether the cleaning of the CIS unit 2 has been completed (S154). The CPU 31 does not proceed to a next step of the present process until the CPU 31 determines that the cleaning of the CIS unit 2 has been completed.

When determining that the cleaning of the CIS unit 2 has been completed (S154: Yes), the CPU 31 causes the CIS unit 22 to read the black-and-white reference member 24 (S155: Single-line reading for stain detection). Then, the CPU 31 extracts, as the improvement check data, the read image data of the white reference section 24a from the image data for the single line of the black-and-white reference member 24 read by the CIS unit 22. Afterward, the CPU 31 compares the improvement check data with the reference data stored in the ROM 32 (S156). Then, the CPU 31 determines the rate of decrease in the pixel value of the improvement check data relative to the corresponding pixel value of the reference data, and determines whether the determined rate of decrease is equal to or higher than the threshold X % (S157).

When determining that the rate of decrease is equal to or higher than the threshold X % (S157: Yes), the CPU 31 increments by one the count value N of the trial number counter (S151). Then, the CPU 31 determines again whether the incremented count value N of the trial number counter is more than the first particular number of times (S152). When determining that the incremented count value N of the trial number counter is not more than the first particular number of times (i.e., when the incremented count value N of the trial number counter is equal to or less than the first particular number of times) (S152: No), the CPU 31 again outputs the cleaning instruction notification signal (S153). Afterward, when determining that the cleaning of the CIS unit 2 has been completed (S154: Yes), the CPU 31 causes the CIS unit 22 to read the black-and-white reference member 24 (S155). Then, the CPU 31 extracts, as the improvement check data, the read image data of the white reference section 24a from the image data for the single line of the black-and-white reference member 24 read by the CIS unit 22. Thereafter, the CPU 31 compares the improvement check data with the reference data stored in the ROM 32 (S156). Then, the CPU 31 determines the rate of decrease in the pixel value of the improvement check data relative to the corresponding pixel value of the reference data, and determines again whether the determined rate of decrease is equal to or higher than the threshold X % (S157).

Thus, the CPU 31 repeatedly performs the output of the cleaning instruction notification signal and the determination as to the rate of decrease until the count value N of the trial number counter exceeds the first particular number of times. Then, when the count value N of the trial number counter exceeds the first particular number of times, the CPU 31 determines that the count value N of the trial number counter is more than the first particular number of times (S152: Yes), and stores the last-obtained improvement check data as new reference data into the ROM 32, thereby updating the reference data to the new reference data (S158).

Further, when determining that the rate of decrease is not equal to or higher than the threshold X % (S157: No) before the count value N of the trial number counter exceeds the first particular number of times, the CPU 31 stores the last-obtained improvement check data as new reference data into the ROM 32, thereby updating the reference data to the new reference data (S158).

The device adjustment process is simplified by the steps S151 to S158 shown in FIG. 6 being executed instead of the steps S117 to S142 shown in FIGS. 4C, 4D, and 4E.

Instead of the configuration to print images in the inkjet recording method, the print head 21 may be configured to print images on the printing surface of the continuous sheet P in a thermal transfer method or in an electrophotographic method.

Further, the label printer 1 may be externally provided with an inspection device that includes a controller (including one or more CPUs) having the same functions as the CIS unit 22 and the CPU 31.

The black-and-white reference member 24 may be attached to a movable member, instead of being provided on the upper surface of the pressing member 23.

In the aforementioned illustrative embodiment, the CPU 31 performs the processes shown in FIGS. 3 and 4A to 4E.

However, the label printer 1 may include a plurality of CPUs. In this case, the plurality of CPUs may perform the same processes as shown in FIGS. 3 and 4A to 4E in cooperation with each other.

The following shows examples of associations between elements exemplified in the aforementioned illustrative embodiment and modifications and elements according to aspects of the present disclosure. For instance, the label printer 1 may be an example of a "printer" according to aspects of the present disclosure. The continuous sheet P may be an example of a "printing medium" according to aspects of the present disclosure. The conveyance rollers 16, the conveyance rollers 17, the conveyance belt 18, the driving roller 19, and the driven roller 20 may be included in examples of a "conveyor" according to aspects of the present disclosure. The feed-out direction may be an example of a "conveyance direction" according to aspects of the present disclosure. The print head 21 may be an example of a "print head" according to aspects of the present disclosure. The CIS unit 22 may be an example of a "reader" according to aspects of the present disclosure. The light source 36 may be an example of a "light source" according to aspects of the present disclosure. The light receiving elements 37 may be included in examples of a "light receiving element" according to aspects of the present disclosure. The ROM 32 may be an example of a "memory" according to aspects of the present disclosure. The white reference section 24a of the black-and-white reference member 24 may be an example of a "white reference section" according to aspects of the present disclosure. The CPU 31 may be an example of a "controller" according to aspects of the present disclosure. In addition, the ROM 32 storing the programs 32a may be included in examples of the "controller" according to aspects of the present disclosure. The CPU 31 may be an example of a "processor" according to aspects of the present disclosure. The ROM 32 storing the programs 32a may be an example of a "non-transitory computer-readable medium storing computer-readable instructions" according to aspects of the present disclosure. The CPU 31 and the ROM 32 storing the programs 32a may form the "controller" according to aspects of the present disclosure. The CPU 31, the ROM 32, the CIS unit 22, and the white reference section 24a may be included in an "inspection device" according to aspects of the present disclosure. The particular period Q may be an example of a "first particular period" according to aspects of the present disclosure. The particular period P may be an example of a "second particular period" according to aspects of the present disclosure. The threshold X % may be an example of a "first threshold" according to aspects of the present disclosure. The threshold Z % may be an example of a "second threshold" according to aspects of the present disclosure. The threshold X % may be an example of a "third threshold" according to aspects of the present disclosure. The threshold Y % may be an example of a "fourth threshold" according to aspects of the present disclosure. The first cleaning instruction notification signal (see S121) may be an example of an "instruction signal" according to aspects of the present disclosure. The second cleaning instruction notification signal (see S130) may be an example of the "instruction signal" according to aspects of the present disclosure. The third cleaning instruction notification signal (see S137) may be an example of the "instruction signal" according to aspects of the present disclosure. The cleaning instruction notification signal (see S153) may be an example of the "instruction signal" according to aspects of the present disclosure.

What is claimed is:

1. An inspection device comprising:
a reader comprising a light source and a light receiving element;
a white reference section;
a memory storing reference data of a white pixel value; and
a controller configured to:
cause the light source to emit light toward the white reference section, and receive a pixel signal output from the reader when the light receiving element receives reflected light from the white reference section, the pixel signal concerning a pixel value according to a light quantity of the reflected light received by the light receiving element;
determine a rate of decrease in the pixel value relative to the reference data, based on the received pixel signal;
when the rate of decrease is equal to or higher than a first threshold, output an instruction signal concerning an instruction to clean the reader;
after outputting the instruction signal, again receive a pixel signal output from the cleaned reader when the light receiving element of the cleaned reader receives reflected light from the white reference section to re-determine the rate of decrease in response to receiving input of a completion signal concerning completion of cleaning of the reader; and
update the reference data using the re-determined rate of decrease.

2. The inspection device according to claim 1,
wherein the controller is further configured to:
when the re-determined rate of decrease is equal to or higher than the first threshold, output the instruction signal again; and
when the re-determined rate of decrease is lower than the first threshold, update the reference data using the re-determined rate of decrease.

3. The inspection device according to claim 1,
wherein the controller is further configured to:
when the re-determined rate of decrease is equal to or higher than a second threshold different from the first threshold, output the instruction signal again; and
when the re-determined rate of decrease is lower than the second threshold, update the reference data using the re-determined rate of decrease.

4. The inspection device according to claim 3,
wherein the controller is further configured to update the reference data using the re-determined rate of decrease, when the re-determined rate of decrease is equal to or higher than the second threshold after the instruction signal has been output a first particular number of times.

5. The inspection device according to claim 4,
wherein the controller is further configured to:
after outputting the instruction signal when the rate of decrease is equal to or higher than the first threshold, and an elapsed period since last update of the reference data is equal to or longer than a first particular period, re-determine the rate of decrease in response to receiving input of the completion signal;
when the re-determined rate of decrease is equal to or higher than the second threshold, output the instruction signal again, to repeat the output of the instruction signal until the re-determined rate of decrease becomes lower than the second threshold;
update the reference data, when the re-determined rate of decrease becomes lower than the second threshold while a number of times the instruction signal has been output is equal to or less than the first particular number of times;
update the reference data, when the re-determined rate of decrease is equal to or higher than the second threshold after the number of times the instruction signal has been output reaches the first particular number of times; and
not update the reference data, when the rate of decrease is equal to or higher than the first threshold, and the elapsed period since the last update of the reference data is shorter than the first particular period.

6. The inspection device according to claim 5,
wherein the memory stores a state of a stain flag, and
wherein the controller is further configured to, when the rate of decrease is equal to or higher than the first threshold, and the elapsed period since the last update of the reference data is shorter than the first particular period, perform:
when the state of the stain flag is "OFF," after outputting the instruction signal, re-determining the rate of decrease in response to receiving input of the completion signal;
when the re-determined rate of decrease is equal to or higher than a third threshold, outputting the instruction signal again, to repeat the output of the instruction signal until the re-determined rate of decrease becomes lower than the third threshold;
when the re-determined rate of decrease becomes lower than the third threshold while the number of times the instruction signal has been output is equal to or less than a second particular number of times, storing the re-determined rate of decrease as a fourth threshold into the memory, and setting the state of the stain flag to "ON";
when the state of the stain flag is "ON," after outputting the instruction signal, re-determining the rate of decrease in response to receiving input of the completion signal;
when the re-determined rate of decrease is equal to or higher than the fourth threshold, outputting the instruction signal again, to repeat the output of the instruction signal until the re-determined rate of decrease becomes lower than the fourth threshold; and
when the re-determined rate of decrease becomes lower than the fourth threshold while the number of times the instruction signal has been output is equal to or less than a third particular number of times, storing the re-determined rate of decrease as the fourth threshold into the memory.

7. The inspection device according to claim 6,
wherein the controller is further configured to:
when the state of the stain flag is "OFF," and the re-determined rate of decrease does not become lower than the third threshold while the number of times the instruction signal has been output is equal to or less than the second particular number of times, output a notification signal concerning a notification that the reader needs to be replaced; and
when the state of the stain flag is "ON," and the re-determined rate of decrease does not become lower than the fourth threshold while the number of times the instruction signal has been output is equal to or less than the third particular number of times, output the notification signal.

8. The inspection device according to claim 6, wherein the controller is further configured to set the state of the stain flag to "OFF" when a second particular period or longer has elapsed since the state of the stain flag was set to "ON."

9. The inspection device according to claim 1, wherein the controller is further configured to:
- after updating the reference data, perform light quantity adjustment for the reader according to the updated reference data, and determine whether the reader needs to be replaced, based on how large an adjustment value for the light quantity adjustment is within an adjustable range; and
- when determining that the reader needs to be replaced, output a notification signal concerning a notification that the reader needs to be replaced.

10. The inspection device according to claim 1, wherein the controller comprises:
- a processor; and
- a non-transitory computer-readable medium storing computer-readable instructions configured to, when executed by the processor, cause the controller to:
  - cause the light source to emit light toward the white reference section, and receive the pixel signal output from the reader when the light receiving element receives the reflected light from the white reference section;
  - determine the rate of decrease in the pixel value relative to the reference data, based on the received pixel signal;
  - when the rate of decrease is equal to or higher than the first threshold, output the instruction signal concerning the instruction to clean the reader;
  - after outputting the instruction signal, re-determine the rate of decrease in response to receiving input of the completion signal concerning completion of cleaning of the reader; and
  - update the reference data using the re-determined rate of decrease.

11. A printer comprising:
- a conveyor configured to convey a printing medium in a conveyance direction;
- a print head configured to perform printing on the printing medium;
- a reader comprising a light source and a light receiving element, the reader being disposed downstream of the print head in the conveyance direction;
- a white reference section;
- a memory storing reference data of a white pixel value; and
- a controller configured to:
  - cause the light source to emit light toward the white reference section, and receive a pixel signal output from the reader when the light receiving element receives reflected light from the white reference section, the pixel signal concerning a pixel value according to a light quantity of the reflected light received by the light receiving element;
  - determine a rate of decrease in the pixel value relative to the reference data, based on the received pixel signal;
  - when the rate of decrease is equal to or higher than a first threshold, output an instruction signal concerning an instruction to clean the reader;
  - after outputting the instruction signal, again receive a pixel signal output from the cleaned reader when the light receiving element of the cleaned reader receives reflected light from the white reference section to re-determine the rate of decrease in response to receiving input of a completion signal concerning completion of cleaning of the reader; and
  - update the reference data using the re-determined rate of decrease.

12. A method implementable on an inspection device, the inspection device comprising a reader comprising a light source and a light receiving element, a white reference section, and a memory storing reference data of a white pixel value, the method comprising:
- causing the light source to emit light toward the white reference section, and receive a pixel signal output from the reader when the light receiving element receives reflected light from the white reference section, the pixel signal concerning a pixel value according to a light quantity of the reflected light received by the light receiving element;
- determining a rate of decrease in the pixel value relative to the reference data, based on the received pixel signal;
- when the rate of decrease is equal to or higher than a first threshold, outputting an instruction signal concerning an instruction to clean the reader;
- after outputting the instruction signal, again receive a pixel signal output from the cleaned reader when the light receiving element of the cleaned reader receives reflected light from the white reference section to re-determining the rate of decrease in response to receiving input of a completion signal concerning completion of cleaning of the reader; and
- updating the reference data using the re-determined rate of decrease.

* * * * *